May 18, 1965 H. NERWIN 3,183,809
PHOTOGRAPHIC APPARATUS FOR USE WITH IMAGE TRANSFER FILM PRODUCT
Filed May 21, 1963 3 Sheets-Sheet 1
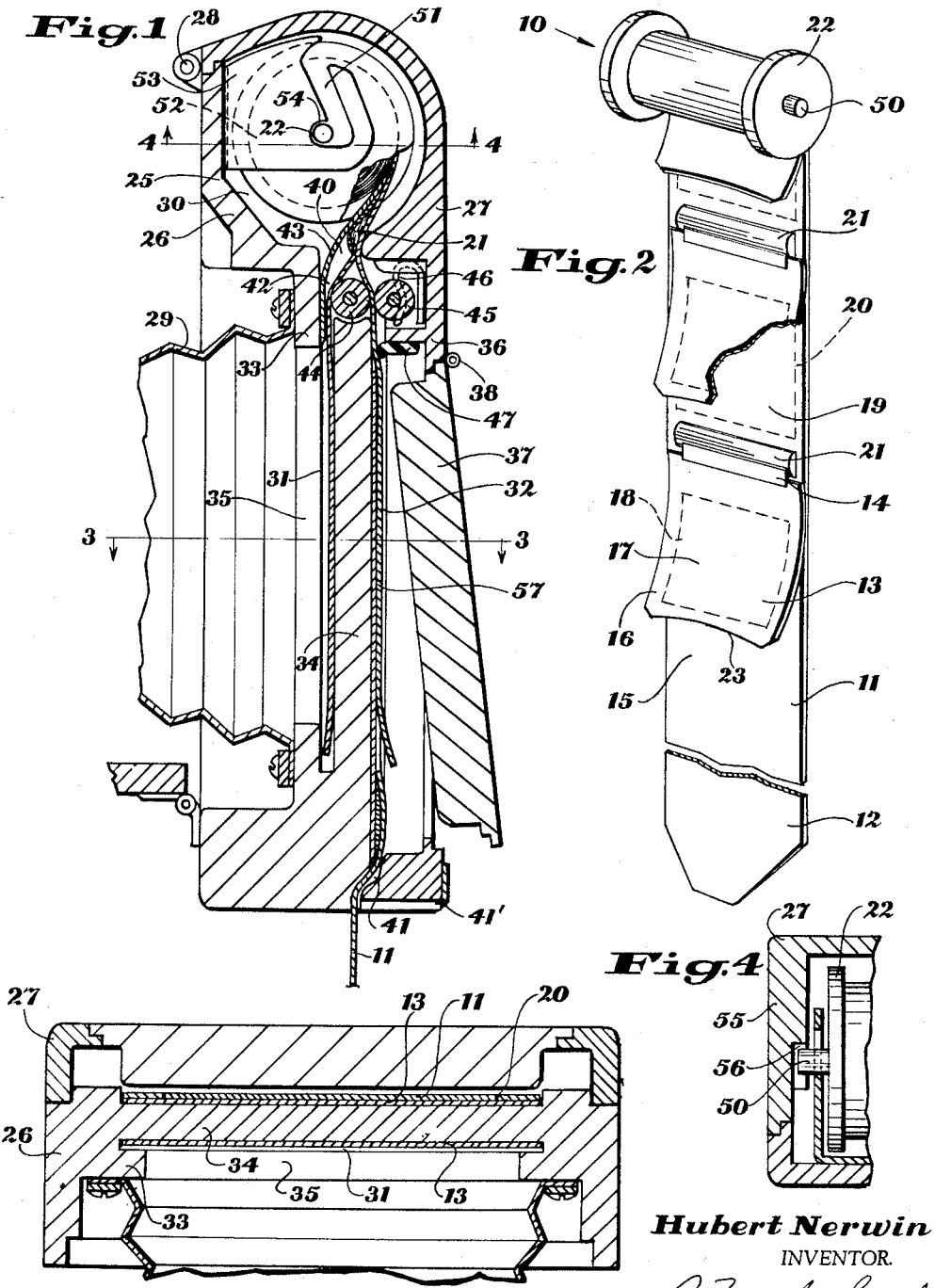
Hubert Nerwin
INVENTOR.
BY R. Frank Smith
Robert F. Crocker
ATTORNEYS May 18, 1965 H. NERWIN 3,183,809
PHOTOGRAPHIC APPARATUS FOR USE WITH IMAGE TRANSFER FILM PRODUCT
Filed May 21, 1963 3 Sheets-Sheet 2
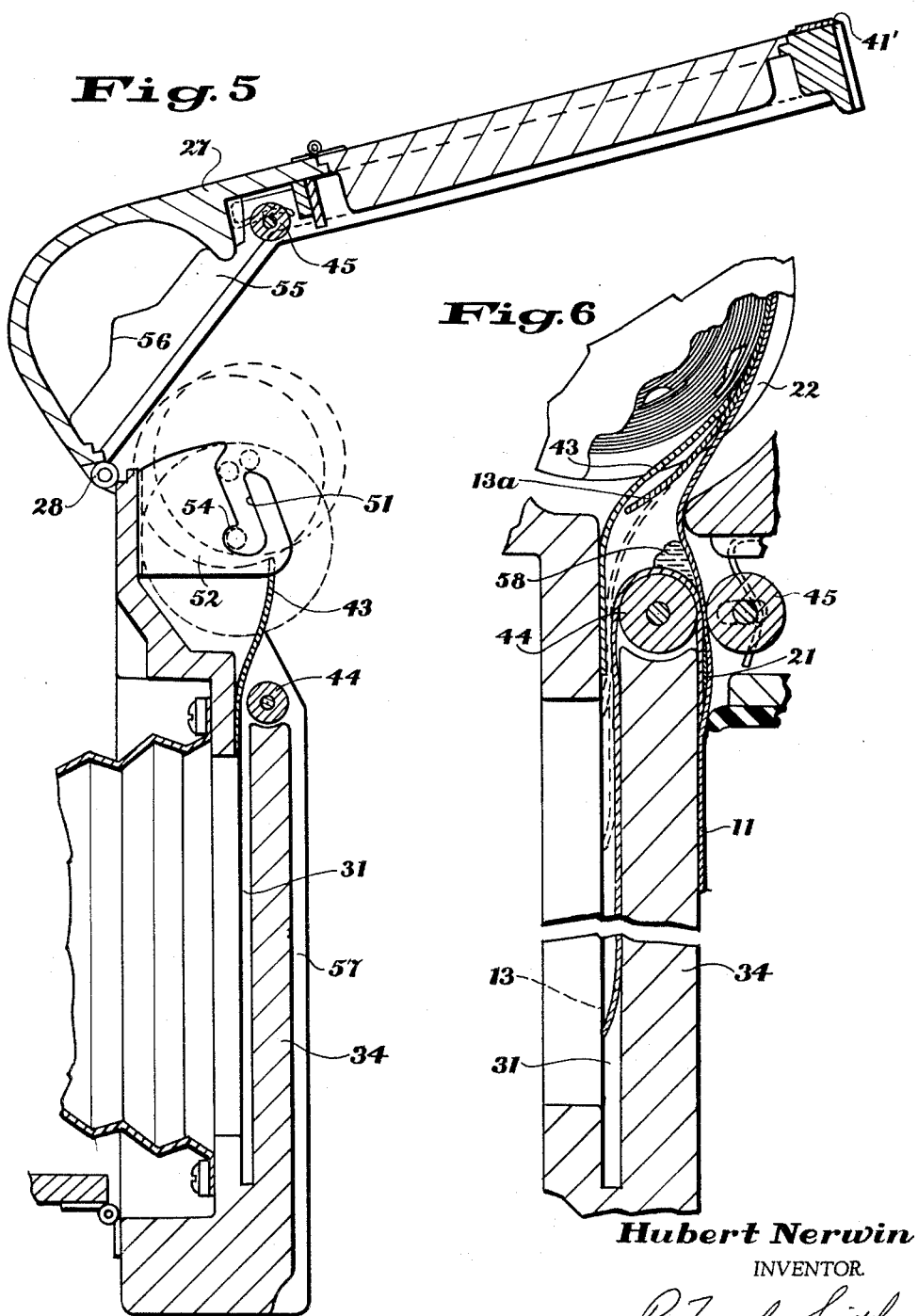
Hubert Nerwin
INVENTOR.
BY R. Frank Smith
Robert F. Crocker
ATTORNEYS Hubert Nerwin
INVENTOR.
BY R. Frank Smith
Robert F. Crocker
ATTORNEYS

United States Patent Office 3,183,809
Patented May 18, 1965

3,183,809
PHOTOGRAPHIC APPARATUS FOR USE WITH IMAGE TRANSFER FILM PRODUCT
Hubert Nerwin, Rochester, N.Y., assignor to Eastman Kodak Company, Rochester, N.Y., a corporation of New Jersey
Filed May 21, 1963, Ser. No. 282,070
14 Claims. (Cl. 95—13)

This invention relates to an improved photographic apparatus for use with image transfer film materials and, more particularly, such materials of the roll type.

Cameras and processing apparatus for use with image transfer film materials and which permit development and processing of individual pictures almost immediately after they have been exposed are well-known in the art. In the usual camera intended for in-camera processing, separate rolls of image receiving materials, one of which is photosensitive and the other of which is transfer-image-receptive, are normally utilized. The camera itself requires two separate chambers, one for the photosensitive film material and the other for the transfer-image receiving material, and a rather complicated and expensive hinged housing construction to permit proper loading and threading of the materials in the camera. Moreover such cameras normally require and are provided with a suitable detent arrangement which will stop the travel of the photosensitive film and receiver materials in proper position for exposure and subsequent processing. This detent must be manually released after each individual exposure and processing operation. As a result cameras of this general type which have heretofore been utilized have been unduly bulky, expensive, and somewhat inconvenient to load and use.

It is an object of this invention to provide processing apparatus for use with roll type image transfer film materials, so constructed that the photosensitive and transfer image receiving materials may be combined in a single roll, with resulting simplicity of structure and convenience in operation of the processing apparatus.

It is a further object of this invention to provide such apparatus which eliminates the need for any strip-holding detent arrangement.

A further object is to provide a photographic camera adapted for in-camera processing of image transfer film materials which is of simpler construction, is less bulky, may be manufactured more inexpensively, and is relatively more convenient to use than those presently known.

Further objects will become apparent from the following description and claims, particularly when considered in the light of the accompanying drawings wherein:

FIG. 1 is a fragmentary sectional view of a processing camera incorporating my invention.

FIG. 2 is a perspective view of the composite image transfer film product of the type intended to be used in the camera of FIG. 1.

FIGS. 3 and 4 are fragmentary cross-sectional views taken on the lines 3—3 and 4—4 of FIG. 1.

FIG. 5 is a fragmentary sectional view showing the back of the camera opened for loading of the film material.

FIG. 6 is an enlarged, somewhat diagrammatic sectional view illustrating the manner in which the photosensitive sheets of the film product are fed into exposure position.

Figure 7:
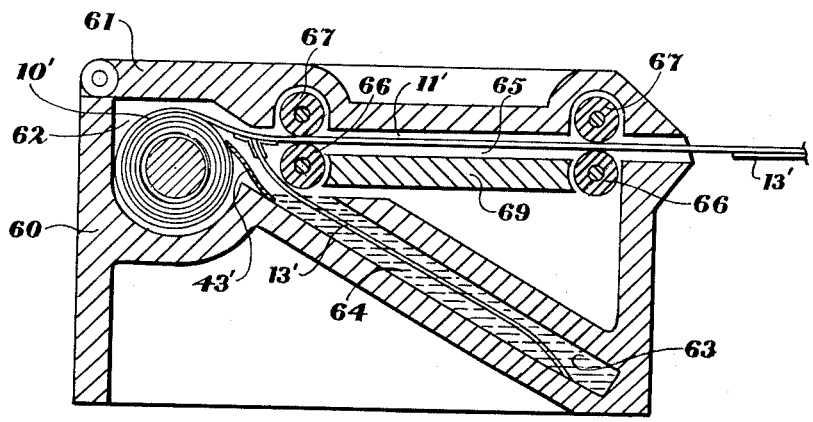

FIG. 7 shows another type of processing apparatus incorporating my invention and which is adapted for processing roll-type image transfer film material which has been previously exposed in a separate conventional camera.

Figure 8:
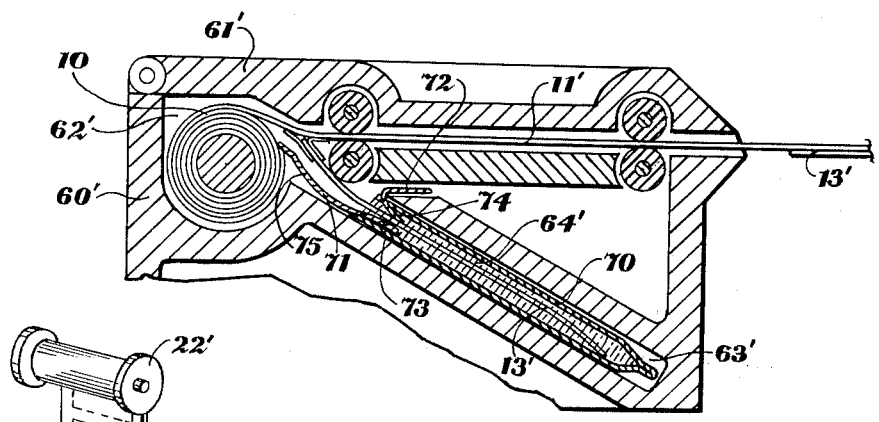

FIG. 8 shows another processor utilizing a slightly modified type of construction from that of FIG. 7.

Figure 9:
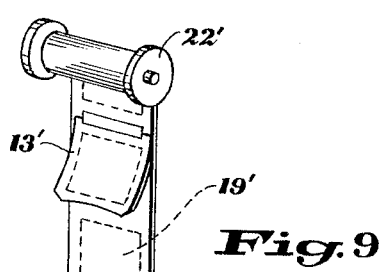

FIG. 9 shows a composite roll-type image transfer film product of the type intended for processing in the apparatus of FIGS. 7 or 8.

Before describing the processing apparatus of my invention a brief description of the general type of film product which is intended to be utilized therein will be given.

This type of composite film product, which I term a "shingled" film, is the subject matter of my copending application Serial No. 227,312, filed October 1, 1962 and to which reference may be made for specific details. However for purposes of understanding the present invention the following description thereof is believed to be sufficient. This composite roll film product 10 is shown in FIG. 2 and comprises an elongated strip 11, at least the leading end portion 12 of which is opaque, and which carries at spaced locations along the length thereof a plurality of individual image receiving sheets 13. Each of the sheets 13 is hingedly secured, as by hinge strips 14, along its trailing edge to the inner or front face 15 of the strip 11. The face 15 of strip 11 and the outer face 16 of each sheet 13 are provided with associated pairs of image receiving areas 17 and 19, one of which is photosensitive and the other of which is adapted to receive an image by transfer and which are adapted to be placed in face-to-face relationship for conjoint processing when the hinged sheet is inverted about its hinge on the strip. In the particular form shown in FIG. 2 at least that portion of the outer face 16 of each sheet 13 within the dashed line 18 constitutes the image area 17 thereon and is formed of a photosensitive material as is well-known in the art. The transfer image receiving area 19 for each pair is carried on that portion of strip 11 immediately rearwardly of the hinged end of the associated sheet 13. Preferably the transfer-image receptive area 19 is outlined by perforations 20 so that, after image transfer has occurred, the area 19 may be removed from strip 11 to give the finished positive print.

As is well known processing of such materials normally involves the spreading therebetween of a processing fluid, usually quite viscous, which initiates the development and image transfer. While many systems for providing and for applying such processing fluid could be used, I have shown rupturable containers 21, similar to those commonly used with conventional image transfer film materials, secured to strip 11 just rearwardly of the hinge for each sheet. These containers or pods are filled with the necessary processing fluid and are intended to be ruptured to release the fluid for spreading between the image areas 17 and 19 during the processing operation. In use each photosensitive sheet 13 is intended to be individually exposed, then relatively inverted about its hinge connection on the strip 11 so as to bring its exposed image area 17 into proper relationship with the transfer image area 19, with the processing liquid or "goo" spread therebetween.

The composite product is initially supplied in roll form, preferably being wound on a suitable spool 22, the strip being so arranged on the spool that the sheet-bearing face 15 is on the inner side of each convolution. This causes the sheets 13 to assume a "curl" or curvature such that when the strip is unwound from the spool the leading edge 23 of each sheet tends to curl slightly away from the adjacent surface of the strip 11. As hereafter explained this curling tendency facilitates the feeding of the sheet into proper position for exposure.

Turning now to the embodiment of my invention in a processing camera as shown in FIGS. 1 and 3–6, the camera comprises a main housing 25 which includes a front body section 26 and a rear body section 27 hingedly secured together as at 28. Suitable latch means, not shown, will, of course, be provided to hold the rear section 27 in its normal closed position with respect to front section 26 and as indicated in FIG. 1. The front body section 26 carries the usual bellows 29, at the forward end of which will be supported the conventional lens, shutter, etc. (not shown).

As best shown in FIG. 1 the housing sections 26 and 27 conjointly provide three interconnected chambers 30, 31 and 32. The first of these, chamber 30, serves as a supply chamber in which the film product is initially loaded and from which it is drawn during operation of the camera. The second chamber, 31, is in the form of a relatively narrow space between the front and rear walls 33 and 34 of the front body section and is adapted to receive the individual sheets 13 and to hold them in proper position for exposure. A suitable exposure opening 35 is provided in the front wall 33 to provide for such exposure. The third chamber, 32, is located between the rear wall 34 of the front body section and the rear wall 36 of the rear body section and constitutes a processing chamber adapted to hold the exposed film sheet and associated portion of the receiver strip while the development and image transfer operations are in progress. Back wall 36 is preferably provided with a door 37 hingedly secured thereto as indicated at 38 and which is shown in FIG. 1 as being partially open. Normally this door will be latched shut (by latch means not shown) but may be opened after processing has been completed to permit removal of the finished print. The housing sections 26 and 27 are also arranged so as to provide a continuous passageway 40 extending from the supply chamber 30 to and through the processing chamber 32 and terminating in an exit slot 41 at the lower end of the latter. As indicated in FIG. 1 the strip 11 is adapted to extend from the supply chamber, along this passageway, through the receiving chamber, and then out through the exit slot 41 so that its end may be manually grasped to perform the desired manipulations of the film product during operation. A cutter 41' is provided adjacent exit slot 41 to facilitate removal of excess material protruding through the slot.

The upper end 42 of exposure chamber 31 constitutes a sheet receiving mouth which communicates directly with passageway 40 between the supply and processing chambers 30 and 32 and is so positioned relative to the path of travel of strip 11 along passageway 40 that the leading end of each sheet 13 will, due to its natural curl and the relative position of the parts, be directed into the sheet receiving exposure chamber 31 as the leading end of the strip 11 is pulled to move the strip along passageway 40. To assist in directing the free end of the sheets into the exposure chamber a thin stripper member 43 of resilient material may be provided, so arranged as to bear lightly against the roll of film material in the supply chamber, as indicated in FIGS. 1 and 6.

Located along passageway 40 at the upper end of the processing chamber 32 is a pair of pressure rollers 44 and 45, one of which is preferably resiliently urged toward the other as by a suitable spring 46. As shown in FIGS. 1 and 5, roller 44 is carried by the front housing section 26 while roller 45 is carried by the rear housing section. The path of movement of strip 11 extends between these processing rollers.

To prevent accidental exposure of the film material when door 37 is opened to remove a finished print, a suitable light seal 47 is preferably interposed between the door and the processing rollers 44 and 45.

To hold the composite film product in proper position in supply chamber 30 the film spool 22 is provided with a pair of stub shafts 50 which are adapted to be inserted into slots 51 formed in end plates 52 of a generally U-shaped mounting bracket 53. As indicated in FIG. 5 the lower or inner ends 54 of slots 51 are offset so that they tend to locate the stub shafts 50 in the position shown in FIG. 1. In order to insure that the spool cannot jump out of this position when the housing is closed and the camera is ready for operation, the side walls 55 of the rear body portion 27 are preferably provided with a pair of abutment surfaces 56 which, as indicated in FIG. 4 will engage the spool shafts 50 to hold them in this position.

To load the camera, rear housing section 27 is swung open as shown in FIG. 5, shafts 50 of a loaded film spool are inserted into the open ends of slots 51 of bracket 53 and the roll 10 is manipulated so to move the shafts into the offset end portions 54 of the slots, successive positions of the spool being indicated by dotted lines in FIG. 5. Such movement of the spool will be against the relatively slight spring tension of stripper 43 which, when the spool is fully inserted, will tend to temporarily hold it in proper position until the rear housing section 27 is closed and abutments 56 take over this function.

Once the roll 10 of composite film product has been thus mounted in the brackets 53, the leading end of the strip 11, which, of course, constitutes the outer convolutions of the coil of material, is pulled from the roll and laid across the rear face 57 of the rear wall 34 of the front body section, sufficient amount of the strip being unwound so that its end portion will extend slightly beyond the lower end of the camera. The rear section 27 of the camera will then be swung about its hinge 28 into closed position thereby automatically bringing pressure rollers 44 and 45 into proper operative relationship. The user will then pull the end of the strip 11 which extends outwardly from the exit slot 41, so as to draw that portion of the strip carrying the first of the individual photosensitive sheets 13 from the roll. As he thus draws strip 11 downwardly, the leading edge of this first sheet will slide along the rear surface of stripper 43 and will pass forwardly of the roller 44 and partition 34 and into the sheet receiving exposure chamber 31. FIG. 6 shows in dashed lines various intermediate positions assumed by the sheet during this phase of the operation. Sheet 13 will continue to move, leading edge foremost, into chamber 31 until the strip 11 has been moved sufficiently to bring the hinge connection by which the sheet is hinged to the strip fairly close to roller 44, substantially as shown in FIG. 1. At this time there will occur a very definite increase in resistance to further movement of the strip 11 and this abrupt increase will indicate to the user that the photosensitive sheet is in position for exposure and that further movement of the strip should be discontinued. After the operator has exposed the photosensitive image area on sheet 13 he will once again grasp the end of strip 11 and, by exerting sufficient force, will pull the hinge connection past the mouth of chamber 31 and into the bite of pressure rollers 44 and 45. As he thus continues to pull strip 11, the exposed sheet 13 will be pulled back around roller 44 and out of the exposure chamber 31, moving along with the strip, hinged-end first, between the two pressure rollers as indicated in FIG. 6. This movement will also cause the pod 21 associated with that particular sheet to be sandwiched between the sheet and the strip as they are pulled between the pressure rollers so that the pod will be burst open and the fluid therein will be spread between the now-facing pair of associated image areas. Thus, during this operation the exposed photosensitive sheet 13 will be pulled, hinged-end first, entirely out of the exposure chamber 31, and effectively inverted upon and laminated to strip 11 with a layer of processing fluid between the pair of image areas. FIG. 6 shows in solid lines the position of the film sheet and receiver strip at an intermediate point during this phase of the operation, just after the pod has been pulled between the pressure rollers. It will be noted that the viscous processing fluid which has been released from the pod forms a bead 58 between the converging surfaces of sheet 13 and strip 11 in such position that it will be spread evenly between the succeeding portions of the sheet and strip as they are drawn between the pressure rollers. Operation in this respect is substantially like that of the image transfer cameras presently in use.

As also shown in FIG. 6, the leading edge of the next succeeding sheet 13a will, at this time, be just ready to enter the exposure chamber. The spacing of the sheets on the strip and the relationship of parts is preferably substantially as shown, so that the succeeding sheet will be moving into the exposure chamber at the same time that an exposed sheet is being withdrawn therefrom. In fact, the two sheets will partially overlap in the exposure chamber throughout a substantial portion of this movement as indicated by the dashed lines in FIG. 6. Moreover the spacing of the sheets on strip 11 and the relative location of the chambers 31 and 32 will preferably be such that the image areas on the sheet and strip which are undergoing processing will lie entirely within the processing chamber 32 at the same time that the next succeeding sheet has reached the proper position for exposure in the exposure chamber, when, as previously explained, there will again occur an abrupt increase in resistance to movement of the strip. After the necessary processing time has elapsed the operator may open the door 37 and separate the finished print from strip 11, perforations 20 facilitating such separation. The excess length of strip 11 extending out through the slot 41 may be conveniently separated from the remainder of the strip with the aid of the cutting blade 41' against which the web may be brought to sever the undesired end portion. The apparatus is then in condition for another exposure and processing cycle.

While one of the big advantages of so-called image transfer film products is their adaptability for use in a camera wherein they may be processed, there are occasions when it is desirable to use a conventional camera for exposing a full roll of film and then a separate processing apparatus for processing the exposed film.

FIGS. 7 and 8 show processors which may be used for this purpose with an image transfer roll film product 10' of the same general "shingled" type as shown in FIG. 2 but which is intended for out-of-camera processing. The composite roll film product 10' is shown in FIG. 9 partially unwound from the spool 21' upon which it would be supplied for processing after it had been exposed. The chief difference from the FIG. 2 film product resides in the fact that the product does not carry its own processing fluid and therefore lacks the pods of the FIG. 2 embodiment. Also the hinged sheets 13' are preferably spaced considerably further apart on the strip 11' so that they will not overlap one another during processing. However, the associated pairs of image areas 17' and 19' bear substantially the same relationships to one another as in the FIG. 2 film product except that the photosensitive image area will, of course, already have been exposed. It is assumed that, as in the FIG. 2 embodiment, the hinged sheets 13' carry the photosensitive image areas and the strip 11' the transfer image areas but the reverse arrangement could also be utilized without change in the processing apparatus. The processor shown in FIG. 7 comprises a main body section 60 having a hinged cover 61 which conjointly form three separate but interconnected chambers: a supply chamber 62, for the roll 10' of exposed composite film material; a sheet-receiving soaking chamber 63, which is adapted to contain a bath 64 of processing fluid; and a processing chamber 65, provided with one or more pairs of squeegee rollers 66 and 67. As previously explained in conjunction with the camera of FIG. 1, the squeegee rollers of each pair are preferably resiliently urged toward one another to apply a desired pressure to the exterior of the strip 11' and sheets 13' as they are drawn therebetween.

Operation of this device is believed obvious in view of the description of the camera operation. Cover 61 is opened and the roll 10' of exposed film is placed in the supply chamber 62 and the leading end of the strip is laid across the lower wall 69 of the processing chamber 65 so as to extend beyond the opposite side of the apparatus. The cover 61 is then closed to render the unit light tight. Pulling on strip 11' will then cause the first sheet 13' of exposed film to move, free end foremost, into the bath of processing fluid 64 in the sheet receiving chamber 63. As was the case with the camera, when the sheet has been substantially fully inserted into the chamber 63, there will be a very abrupt and definite increase in resistance to further movement of the strip 11'. The operator will then permit the sheet to soak for the desired length of time in the processing liquid and then will resume pulling on the strip 11' so as to pull the sheet and web together between the processing or squeegee rollers 65 and 66, thereby effectively inverting the sheet on the strip so as to bring the image areas 17' and 19' into proper relationship for image transfer. If the film and receiver strip are of opaque materials the sandwich may be be immediately pulled all the way out of the apparatus for completion of the image transfer outside of the unit. However if one of these materials is transparent, the laminated sandwich formed by the sheet and associated web portion should be permitted to remain in the processing chamber until the actual image transfer has been completed. Repeating this operation for each successive sheet will result in complete processing of the entire roll of exposed film material.

It was previously mentioned that when the composite film product is to be processed in apparatus of this type the spacing between successive sheets is preferably greater than that with film for use in the processing camera. This will minimize the possibility of smearing the wet emulsion on a sheet as it is being withdrawn from the bath 64 after soaking, since the next sheet will not begin to enter chamber 63 until after the wet sheet has been removed. Moreover this lets the soaking time and the image-transfer time be different, since the wet sheet will have been inverted and laminated against the strip for transfer before the soaking of the next sheet begins. The latter will not occur until the strip is again pulled sufficiently to bring the now-processed sandwich outside of the apparatus.

The processing fluid used with image-transfer materials of the type under consideration is frequently quite strongly alkaline and must be carefully handled during the filling and emptying of the soaking chamber of such a processor. To simplify the problem of handling this fluid, the fluid necessary for processing a full roll of film may instead be supplied in a sealed plastic container which is itself capable of insertion in the soaking chamber of the processor. Such an arrangement is shown in FIG. 8 wherein a container 70 filled with processing fluid 64' is positioned within the chamber 63' of a processor substantially like that of FIG. 7. The container lips 71 and 72 are initially releasably sealed together and are pulled apart prior to slipping the container into the chamber 63'. Preferably there lips are formed with inwardly extending flap portions 73 and 74 which tend to minimize spilling of the fluid during insertion or removal of the container from the chamber. Lip 71 is also preferably sufficiently stiff that its upper end portion 75 will bear against the roll of material in chamber 62' so as to serve as a stripper which helps direct the sheet ends into the mouth of the container for immersion in the bath 64'. Operation of the FIG. 8 processor is substantially identical to that of FIG. 7 and no additional description is deemed necessary.

While I have illustrated only three specific forms of processing apparatus for use with roll film products of the type under consideration it is to be understood that many variations can be made without departing from the novel inventive concept involved.

Thus, for example, my previously mentioned copending application Serial No. 227,312 describes many variations of the film product itself, and obviously slight modifications in the relative positions of parts in the camera or processing apparatus could be made to permit use of such modified products. For example, if the individual sheets of the film product to be used in the processing camera were spaced somewhat further apart from one another than they are shown in FIG. 2, there would be no need for the hinged door for print removal, since, after processing, the finished assembly could be pulled beyond the end of the exit slot prior to separation of the print. With film of this particular type each photosensitive sheet would be completely removed from the exposure chamber before the next succeeding sheet began to move into the chamber just as was described in conjunction with the processor of FIG. 7. While the sheet receiving chamber in the particular camera described serves also as the exposure chamber, this is not essential and the parts could obviously be so arranged that exposure of the film obtained at some other location in its travel from the supply chamber to the processing chamber. Moreover it is not necessary that the hinged sheet be the photosensitive element since it would be quite possible to provide the photosensitive surface on the strip itself and the transfer image receptive surface on the sheet, and to invert the latter onto the former for processing.

To avoid unnecessarily complicating and drawings and description no attempt has been made to show the detailed mounting of the processing rollers and/or the means for controlling the thickness of the spread layer of processing fluid in the camera, etc. Such details are well known in the image transfer processing camera art and form no part of the present invention. It is, of course, contemplated that suitable provisions for obtaining the desired uniformity of spread would be utilized.

Similarly no attempt has been made to describe the specific materials used in the film product and processing fluid, etc. Here again the invention is quite independent of the specific materials utilized and any materials of the type well known in the image transfer art could obviously be used.

These and many other modifications could obviously be made without departing from the spirit and scope of the invention as defined by the appended claims.

I claim:

1. Photographic apparatus for use with a composite photographic product of the type comprising an elongated strip having a leading end and at least one sheet hingedly secured along one end to an intermediate portion of one face of said strip, said sheet having an image receiving area on one face thereof and being arranged on said strip so that its free end extends toward said leading end and said image area faces outwardly from said strip, said image area being adapted for photographic processing in conjunction with an associated area carried by said strip rearwardly of the hinged connection, said apparatus comprising:

a housing providing
a supply chamber for holding said composite product, and a processing chamber;
means forming a passageway extending between said chambers and through which said sheet may be transferred from said supply chamber to said processing chamber by moving said strip, leading-end-foremost, therealong in the direction of said processing chamber;
and means located along said passageway intermediate said chambers and effective upon such movement of the sheet-bearing portion of said strip therepast for effectively inverting said sheet about its hinge connection with said strip to bring said image area into position for processing with its associated area on said strip.

2. Photographic apparatus as in claim 1 further comprising processing means associated with said processing chamber for pressing said image area into substantial face-to-face relationship with said associated area.

3. Photographic apparatus as in claim 1 for use with such a product wherein one of said areas is photosensitive, said housing being further provided with an exposure station to which said photosensitive area is brought for exposure thereof during the course of said movement from said supply to said processing chamber and prior to the inversion of said sheet on said strip.

4. Photographic apparatus as in claim 3 further comprising processing means associated with said processing chamber for pressing said photosensitive area and associated other area into substantial face-to-face relationship upon inversion of said sheet on said strip.

5. Photographic apparatus for use with a composite photographic product of the type comprising an elongated strip having a leading end and at least one sheet of image-receptive material adapted for photographic processing in conjunction with said strip, said sheet being hingedly secured at its one end to an intermediate portion of said strip and with its free end extending toward the leading end of said strip, said apparatus comprising:

a housing providing
a supply chamber for holding said composite product within said housing,
a passageway for said product extending from said supply chamber,
a sheet-receiving chamber having an opening communicating with said passageway intermediate the length of said passageway,
and means associated with said sheet-receiving chamber and said passageway and effective upon movement of said strip, leading-end-foremost, along said passageway in a direction away from said supply chamber for directing said sheet, free-end-foremost, through said opening into said chamber,
and said means being responsive to further movement of said strip along said passageway in said same direction to pull said sheet, hinged-end-foremost, from said chamber whereby to effectively invert said sheet relative to said strip for processing in conjunction with the then-underlying portion of said strip.

6. Photographic apparatus as in claim 5, further comprising means located along said passageway beyond said opening for pressing said strip and sheet toward one another into substantial face-to-face relationship.

7. Photographic apparatus as in claim 5, wherein said passageway beyond said opening is formed to provide a processing chamber the length of which is at least as great as the length of said sheet.

8. Photographic apparatus as in claim 7, further comprising means associated with said processing chamber for pressing said strip and sheet toward one another into substantial face-to-face relationship.

9. A camera for exposing and processing a composite photographic product of the type including an elongated strip having leading and trailing ends and a plurality of sheets individually hingedly secured along their trailing edges at spaced intervals along one face of said strip, each sheet being provided with a photosensitive layer facing outwardly from said strip and said strip carrying a transfer-image-receptive layer rearwardly of and associated with each such sheet, said camera comprising:

a substantially light-tight housing providing
an exposure chamber,
a processing chamber,
and a supply chamber for said composite product;
guide means within said housing and including a divider between said exposure and processing chamber,
means for guiding said strip along a first path extending from said supply chamber past said divider on one side thereof and through said processing chamber,
means effective upon movement of said strip along said first path toward said processing chamber for directing the leading edge of each said sheet along a second path branching from said first path and passing on the other side of said divider and into said exposure chamber for exposure of said photosensitive layer, said divider being effective upon continued movement of said strip in said same direction along said first path to cause such sheet to be effectively pulled, hinged-end-foremost back past said divider and through said processing chamber in inverted position on said strip with said photosensitive and image-receptive layers facing one another, and means associated with said processing chamber for pressing said layers toward one another for conjoint processing.

10. Photographic apparatus for use with a composite photographic product of the type comprising an elongated strip having a leading end and a plurality of discrete sheets carried by said strip, each sheet having an image-receiving area on one face thereof, and said sheets being individually hingedly secured along one end to one face of said strip at longitudinally spaced intervals therealong and positioned thereon with their free ends extending toward the leading end of said strip and with their image areas facing outwardly therefrom, said sheets being adapted for photographic processing in conjunction with associated portions of said strip, said apparatus comprising:

a housing providing
a supply chamber for said composite product,
and a processing chamber;
means forming a passageway extending from said supply chamber to said processing chamber and through which said sheets may be transferred from said supply chamber to said processing chamber by moving said strip, leading-end-first, therealong in the direction of said processing chamber, and means located along said passageway intermediate said chambers and effective upon such movement of each sheet-bearing portion of said strip therepast for effectively inverting the sheet carried by that portion of said strip about its hinge connection with said strip to place its image area into position facing said strip for conjoint processing therewith.

11. Photographic apparatus for use with a composite photographic product of the type comprising an elongated strip having a leading end, and a plurality of sheets individually hingedly secured at one end to one face of said strip at longitudinally spaced locations thereon with each sheet having its free end extending forwardly along said strip toward said leading end and having an image-receiving area thereon facing outwardly from said strip and adapted for photographic processing in conjunction with an associated image-receiving area carried on said strip immediatey rearwardly of each said sheet, said apparatus comprising, a housing providing
a supply chamber for holding a supply of said composite product,
a sheet receiving chamber having a mouth at one end thereof,
and an exit opening spaced from said chambers and through which said strip may be withdrawn from said housing;
means for guiding said strip for movement along a predetermined path lying entirely outside of said sheet-receiving chamber and extending from said supply chamber, past the mouth of said sheet-receiving chamber and to and through said exit opening, and means effective upon movement of said strip, leading-end foremost, so as to move one of the sheet-bearing portions thereof from said supply chamber and along said path past said sheet-receiving chamber to direct the sheet carried by such portion, free-end-foremost, through said mouth and into said sheet-receiving chamber, continued movement of said strip in said same direction causing said sheet to be pulled, hinged-end-foremost, from said mouth whereby to effectively invert said sheet on said strip portion to superimpose the associated pair of image-receiving areas in substantial face-to-face relationship for conjoint processing.

12. Photographic apparatus as in claim 11 wherein means is provided along that portion of said path between said mouth and said exit opening for pressing said strip and said individual sheets together.

13. Photographic apparatus as in claim 11 for use with a product as set forth therein and wherein one of each associated pair of image areas is photosensitive, said apparatus further comprising an exposure station to which the photosensitive one of each pair of image areas is moved prior to its face-to-face superimposition with its associated image area.

14. Photographic apparatus as in claim 11 for use with a product as set forth therein and wherein the image-area on each said sheet is photosensitive, one side of said sheet-receiving chamber being provided with an exposure opening opposite which the photosensitive image-area of each sheet is positioned when said strip is positioned along said path so that its hinge connection with said sheet is substantially directly opposite the mouth of said sheet-receiving chamber.

No references cited.

NORTON ANSHER, *Primary Examiner.*

JOHN M. HORAN, *Examiner.*

Notice of Adverse Decision in Interference

In Interference No. 95,697 involving Patent No. 3,183,809, H. Nerwin, PHOTOGRAPHIC APPARATUS FOR USE WITH IMAGE TRANSFER FILM PRODUCT, final judgment adverse to the patentee was rendered May 28, 1969, as to claims 1, 2, 3, 4, 5, 6, 9, 10, 11, 12, 13 and 14.

[*Official Gazette November 25, 1969.*]